(12) United States Patent
Chiu

(10) Patent No.: US 6,756,719 B1
(45) Date of Patent: Jun. 29, 2004

(54) ELECTRICAL GENERATOR WITH SEPARATED COIL AND SET OF MAGNETS

(75) Inventor: Chun-Chen Chiu, Taichung Hsien (TW)

(73) Assignees: Ming-Hua Fu, Nantou Hsien (TW); Meng-Yu Liu, Taiping (TW)

(*) Notice: Subject to any disclaimer, the term of this patent is extended or adjusted under 35 U.S.C. 154(b) by 0 days.

(21) Appl. No.: 10/289,645

(22) Filed: Nov. 7, 2002

(51) Int. Cl.[7] .............................. H02K 1/12; B62J 6/06
(52) U.S. Cl. ...................... 310/257; 310/216; 310/267; 310/75 C
(58) Field of Search .................................. 310/216–218, 310/254, 261, 264, 267–268, 75 C, 257, 42

(56) References Cited

U.S. PATENT DOCUMENTS 5,977,684 A * 11/1999 Lin ............................ 310/268
6,140,730 A * 10/2000 Tkaczyk et al. ............. 310/181
6,509,666 B1 * 1/2003 Huang et al. ................ 310/254

FOREIGN PATENT DOCUMENTS

JP          08-058651 A  *  3/1996

* cited by examiner

Primary Examiner—Tran Nguyen
(74) Attorney, Agent, or Firm—Alan D. Kamrath; Nikolai & Mersereau, P.A.

(57) ABSTRACT

An electrical generator includes a coil, a coil seat and a set of permanent magnets. The coil and the set of permanent magnets are separated from each other. The coil is mounted in the coil seat so that either the coil or the set of permanent magnets can rotate relative to the other. The set of permanent magnets has multiple north poles and south poles arranged alternately. The set of permanent magnets is adjustably positioned relative to the coil seat. The set of permanent magnets is maintained a distance from the coil seat and induces a voltage in the coil in the coil seat when the set of permanent magnets rotates relative to the coil.

4 Claims, 7 Drawing Sheets

ELECTRICAL GENERATOR WITH SEPARATED COIL AND SET OF MAGNETS

BACKGROUND OF THE INVENTION

1. Field of the Invention

The present invention relates to an electrical generator, and more particularly to an electrical generator with a coil and a set of magnets that are separated from each other.

2. Description of Related Art

Electrical generators convert mechanical energy to electricity. A conventional generator includes a stator and a rotor. The stator has a frame and a winding. The frame has an inner space defined longitudinally and the winding is mounted in the frame around the inner space. The winding is made of conductive wire so the winding will conduct a current.

The rotor includes a set of permanent magnets and an armature. The set of permanent magnets has north and south poles alternately mounted circumferentially on the armature. When the generator is assembled, the armature is rotatably mounted in the inner space in the stator, and the set of permanent magnets is positioned corresponding to the winding. A gap exists between the set of permanent magnets and the winding. A bearing is attached to the armature at a side of the set of permanent magnets respectively to hold the armature and allow it to rotate relative to the stator.

When the armature is coupled to a prime mover such as a water turbine, the water turbine rotates the armature, and the set of permanent magnets is rotated by the armature relative to the winding in the stator. The rotating set of permanent magnets induces an electromotive force in the winding.

However, conventional generators still has some shortcomings that include:

1. Proper alignment of the rotor and the stator is critical, which may make assembly difficult.

Because the rotor rotates at a very high speed inside the stator, the armature of the rotor must be precisely positioned to ensure that the rotor does not contact the stator during operation of the generator. The assembly of the rotor and the stator is made more difficult because two bearings are required to carry the weight of the armature.

2. Manufacturing costs are high.

The precise positioning of the rotor and the stator require complicated processes and equipment that directly result in increased manufacturing costs.

To overcome the shortcomings, the present invention provides an electrical generator with a separate coil and magnet set to mitigate or obviate the aforementioned problems.

SUMMARY OF THE INVENTION

The main objective of the invention is to reduce costs and time to manufacture an electrical generator.

Other advantages and novel features of the invention will become more apparent from the following detailed description when taken in conjunction with the accompanying drawings.

DETAILED DESCRIPTION OF PREFERRED EMBODIMENT

Faraday's Law states that a changing magnetic field will induce a voltage in a coil of conductive wire. More specially, Faraday's Law states that a time-varying flux induces an electromotive force (emf) in the coil.

Figure 1:
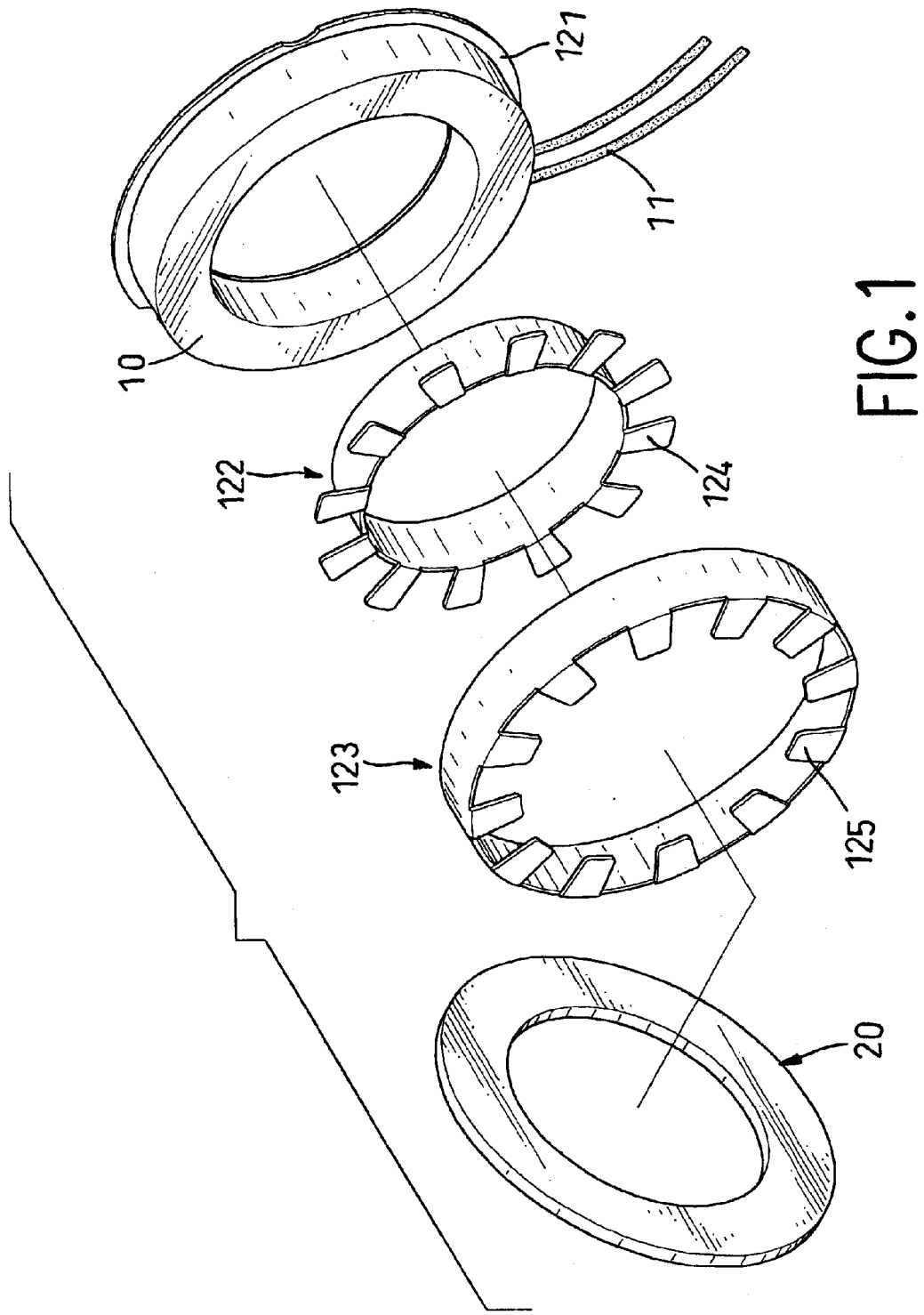
FIG. 1 is an exploded perspective view of an electrical generator in accordance with the present invention.
Figure 2:
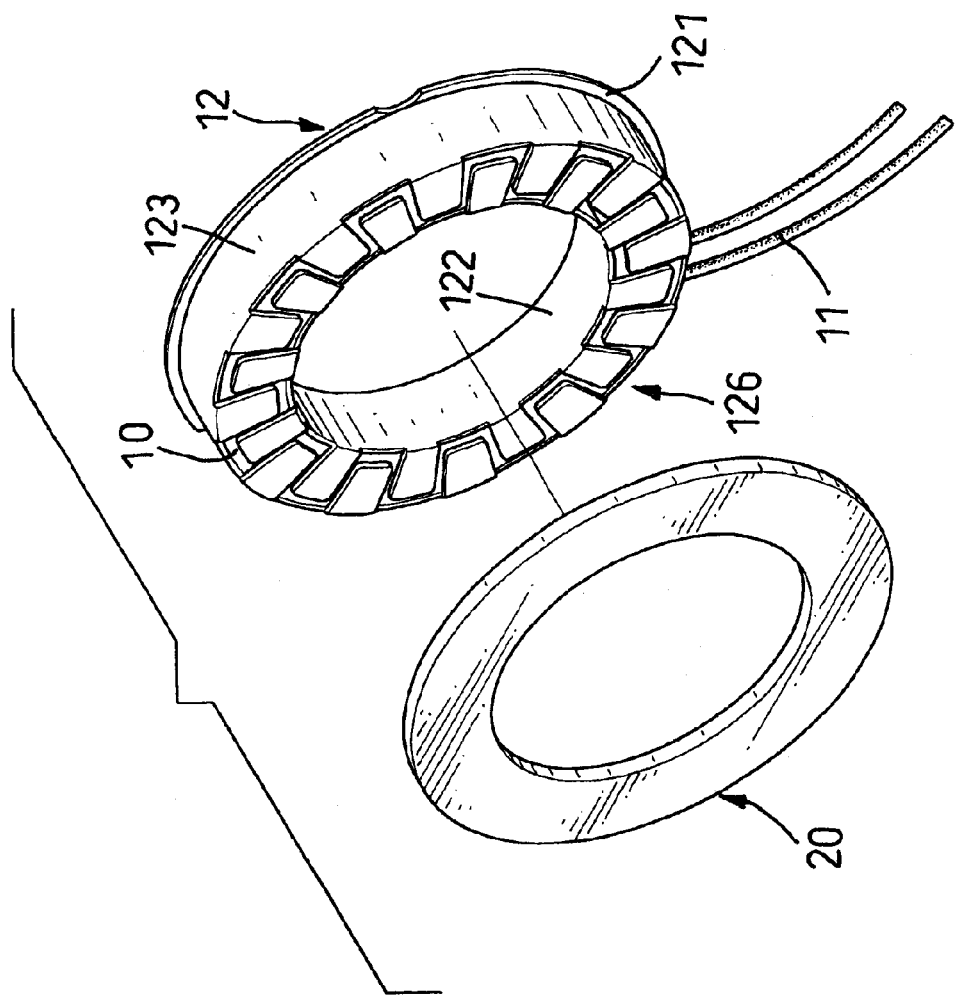
FIG. 2 is a perspective view of the generator in FIG. 1.

With reference to FIGS. 1 and 2, an electrical generator in accordance with the present invention comprises a coil (10), a coil seat (12) and a set of permanent magnets (20). An electrically conductive wire (not numbered) is wound in a ring shape to form the coil (10). The coil (10) has a first side (not numbered), a second side (not numbered) and two connecting wires (11). The connecting wires (11) are electrically connected respectively to opposite ends of the conductive wire forming the coil (10) and extend out of the coil seat (12).

The coil (10) is mounted in the coil seat (12). The coil seat (12) includes a base (121), an inside sidewall (122) and an outside sidewall (123). The inside sidewall (122) and the outside sidewall (123) respectively have an inner edge (not numbered) and an outer edge (not numbered). The base (121) is attached to the first side of the coil (10) and is made of metal. The inside sidewall (122) and the outside sidewall (123) are mounted perpendicular to the base (121) with the inner edges in contact with the base (121) and collectively envelop the coil (10). Multiple inside tabs (124) are formed on the outer edge of the inside sidewall (122) and extend out radially from the inside sidewall (122). Multiple outside tabs (125) are formed on the outer edge of the outside sidewall (123) and extend radially from the outside sidewall (123). The inside tabs (124) and the outside tabs (125) are formed to interleave each other on the second side of the coil (10) to form an induction surface (126).

Figure 3:
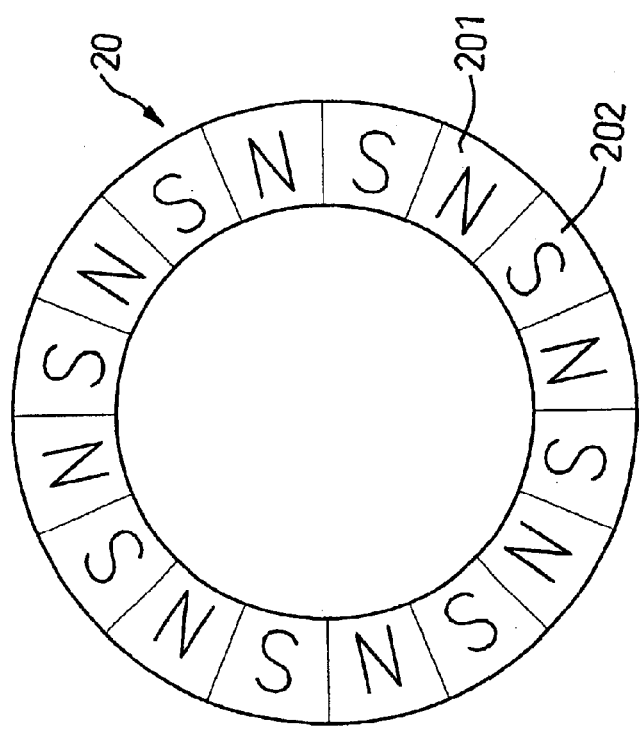
FIG. 3 is a plan view of a set of permanent magnets that has the north and south poles arranged alternately.

The set of permanent magnets (20) is positioned so the poles face the induction surface (126) at a finite distance away from the induction surface (126). With further reference to FIG. 3, the set of permanent magnets (20) in this embodiment is formed in a ring with the north poles (201) and south poles (202) arranged alternately. The set of permanent magnets (20) can be implemented with individual permanent magnets (not shown) arranged in a ring with the north poles (201) and south poles (202) alternating.

When the set of permanent magnets (20) rotates relative to the coil seat (12), the north poles (201) and the south poles (202) induce a corresponding magnetic field in the corresponding inside and outside tabs (124, 125). For example, if one of the inside tabs (124) is facing one of the north poles (201), this north pole (201) induces a magnetic field in this inside tab (124) with the corresponding polarity. As the set of permanent magnets (20) rotates relative to the coil seat (12), the south pole (202) adjacent to that north pole (201) is rotated to face the same inside tabs (124) and induces a magnetic field with an opposite polarity into this inside tab (124). Because the poles (201, 202) are arranged alternately, the polarity of the magnetic field induced in each inside tab (124) and outside tab (125) is reversed repeatedly by the alternating north poles (201) and south poles (202) on the rotating ring. The magnetic field at any given point on the coil (10) changes with time as the ring rotates, and the time-varying flux of the changing magnetic field induces a voltage in the coil (10).

Figure 4:
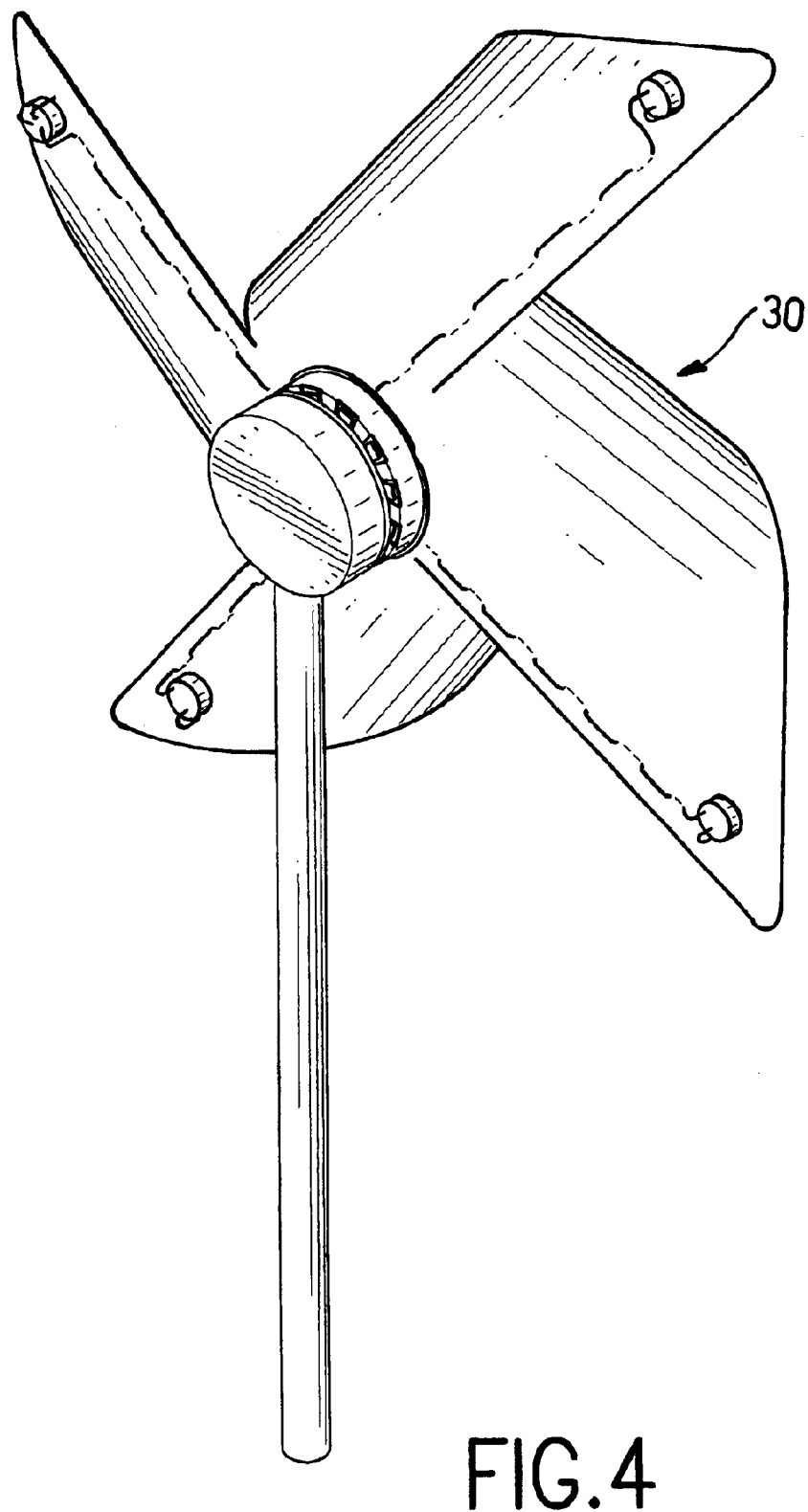
FIG. 4 is an operational perspective view of a wind generator with the generator in FIG. 2.
Figure 5:
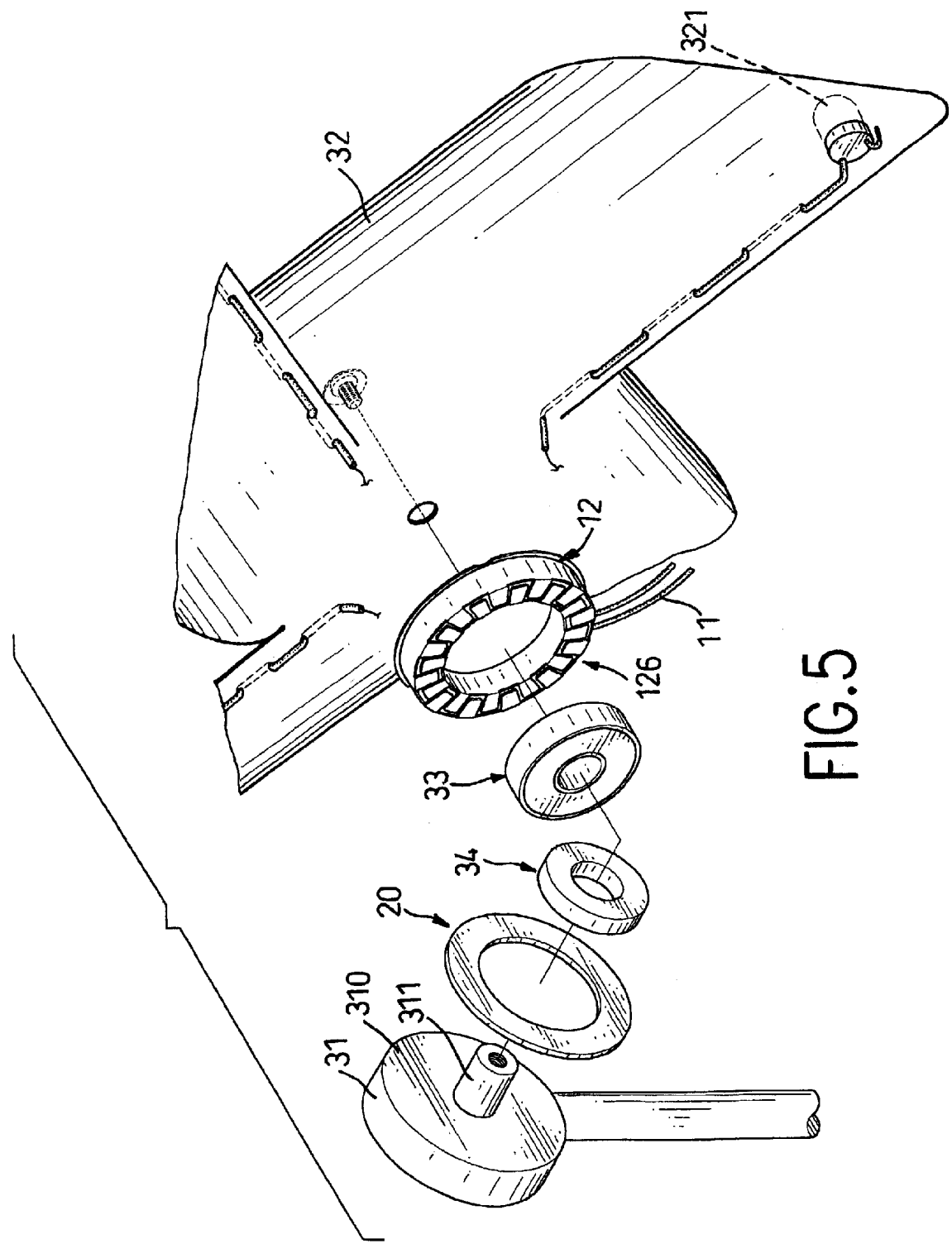
FIG. 5 is an exploded perspective view of the wind generator in FIG. 4.

With reference to FIGS. 4 and 5, the generator is used in a wind generator (30). The wind generator (30) includes a support pole (31) and a wind turbine (32). The support pole (31) has a top (not numbered), a side surface (310) and a pivot pin (311). The side surface (310) is defined at the top of the support pole (31), and the pivot pin (311) is formed perpendicular to the side surface (310). The set of permanent magnets (20) is attached securely to the side surface (310). The wind turbine (32) has a center (not numbered) facing the side surface (310), and the coil seat (12) is attached securely to the wind turbine (32) at the center. Several illumination elements (321), such as LEDs, are mounted respectively on blades of the wind turbine (32) and adapted to electrically connect to the connecting wires (11).

The wind turbine (32) is rotatably mounted on the pivot pin (311) by means of a bearing (33). A washer (34) is mounted between the side surface (310) and the bearing (33) to maintain a distance between the coil seat (12) and the set of permanent magnets (20). Thus, when the wind turbine (32) is rotated by wind relative to the support pole (31), the rotating wind turbine (32) rotates the coil seat (12) relative to the set of permanent magnets (20). A current is generated in the coil (not shown in FIG. 5) and lights the illumination elements (321). This will provide an additional recreational effect to a wind turbine such as a pinwheel and make the pinwheel more interesting.

Figure 6:
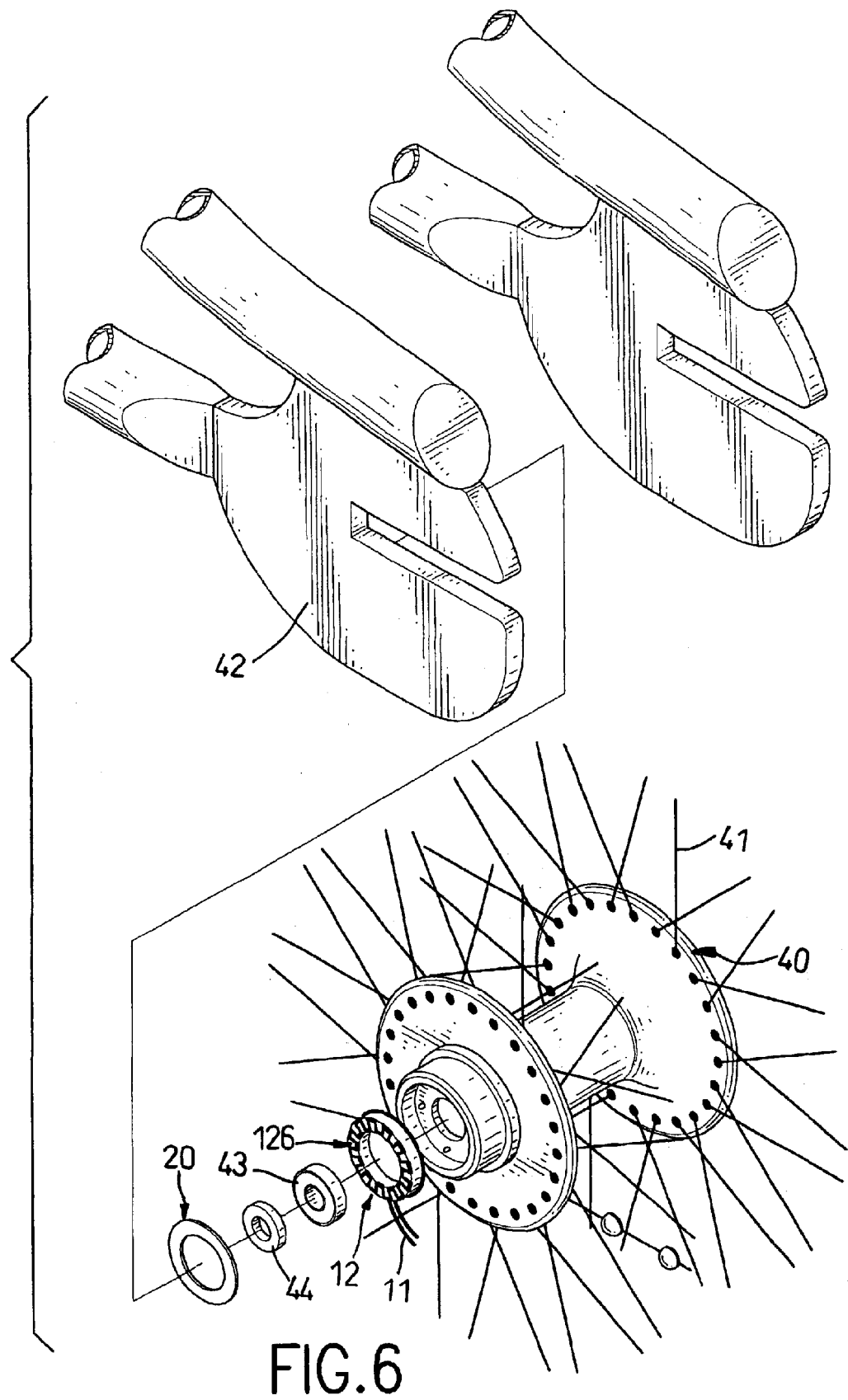
FIG. 6 is an exploded partially perspective view of an axle-mounted bicycle generator with the generator in FIG. 2.

With reference to FIG. 6, the generator can also be used with a bicycle (not shown) wheel (not numbered). The wheel has a non-rotating shaft (not numbered), a hub (40) and multiple spokes (41) and is rotatably mounted on a fork (42) of the bicycle. The set of permanent magnets (20) is securely attached to the non-rotating shaft attached to the fork (42), and the coil seat (12) is mounted in one side of the hub (40). Several illumination elements (not shown) can be attached to the spokes (41), and each illumination element is electrically connected to the connecting wire (11). A bearing (43) is mounted in the coil seat (12) around the non-rotating shaft, and a washer (44) is mounted between the bearing (43) and the fork (42) to separate the set of permanent magnets (20) and the coil seat (12). When the hub (40) rotates with the wheel and rotates the coil seat (12) relative to the set of permanent magnets (20), the set of permanent magnets (20) induces a voltage in the coil (not shown in FIG. 6) in the coil seat (12), and a current lights the illumination elements. This provides a special visual effect and warning when a person rides a bicycle at night.

Figure 7:
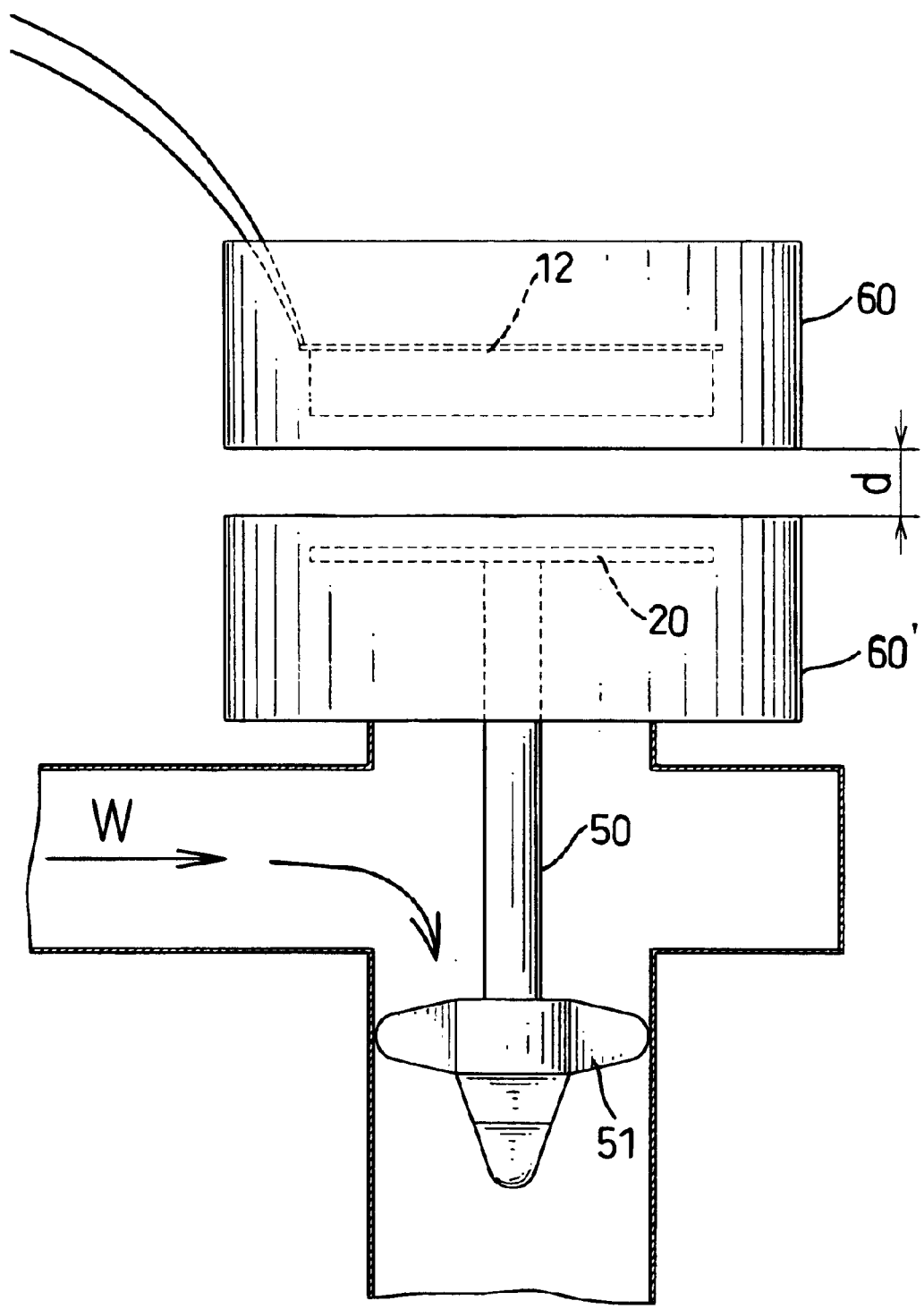
FIG. 7 is an operational side plan view of a hydroelectric generator.

With reference to FIG. 7, the generator can also be used in a hydroelectric generating system. The coil seat (12) and the set of permanent magnets (20) are located in two carriers (60, 60'). Each carrier (60, 60'), as a protector isolates the elements inside the carrier (60, 60') from the surrounding environment. The carriers (60, 60') contain the coil seat (12) and the set of permanent magnets (20), respectively. The carries (60, 60') are positioned vertically, and one of the carriers (60, 60') is kept an adjustable distance (d) from the other. A driving shaft (50) is rotatably mounted in one carrier (60) with one end extending out of the carriers (60). A water turbine (51) is attached to the end of the driving shaft (50) that extends out of the carrier (60), and the set of permanent magnets (20) is attached to the other end of the driving shaft (50) inside the carrier (60). Water (W) flows across, applies torque on and rotates the water turbine (51). The set of permanent magnets (20) is rotated by the driving shaft (50). The set of rotating permanent magnets (20) induces a voltage in the coil (not shown in FIG. 7) in the coil seat (12).

A magnetic force in the set of permanent magnets (20) attracts the coil. Magnetic attraction between the set of permanent magnets (20) and the coil is proportional to the distance (d) between the two carries (60, 60'). The shorter distance (d), the bigger the magnetic attraction. Starting the rotation of the driving shaft (50) is hard when the set of permanent magnets (20) is very close to the coil. Torque applied to the driving shaft (50) to start the driving shaft (50) to rotate depends on the distance (d) between the carriers (60, 60'). When the distance (d) between the carriers (60, 60') is short, a large starting torque is needed to start rotating the driving shaft (50). Because flow rate of the water (W) may be not uniform, the distance (d) is adjustable to adapt to a particular volume of water (W) to overcome the starting torque of the driving shaft (50) to start rotating. If the flow of the water (W) is slow, the distance (d) is adjusted to be long to make the driving shaft (50) start rotating easily. Furthermore, the distance (d) can be adjusted so electricity will be generated at all times no matter whether the flow of water (W) is fast or slow.

The electrical generator has the following advantages.

1. Assembly time and cost is reduced.

The position of the set of permanent magnets (20) respect to the coil (10) does not have to be fixed at the time of assembly. Only one bearing must be installed during assembly for the generator to work well.

2. The generator can be used in many applications.

The coil (10) and the set of permanent magnets (20) can be isolated from the surrounding environment that may have pollutants or corrosives such as water vapor or acid vapor by a protector. In a hydroelectric power system, the distance (d) between the coil (12) and the set of permanent magnets (20) can be adjusted to accommodate changes in the flow water of to generate electricity.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical generator comprising:

a coil having a first side, a second side and two connecting wires electrically connected to the coil, with the coil formed into a ring shape;

a coil seat mounted around the coil and having an induction surface at a side corresponding to the second side of the coil, and with the connecting wires passing out of the coil seat:

wherein the coil seat further comprises;

a base attached to the first side of the coil;

an inside sidewall and an outside sidewall extending perpendicular to the base and enveloping the coil, with each of the inside and outside sidewalls including an inner edge and an outer edges, with the inner edges connected to the base;

multiple inside tabs formed on the outer edge of the inside sidewall; and multiple outside tabs formed on the outer edge of the outside sidewall;

wherein, each inside tab is bent toward the outside sidewall and each outside tab is bent toward the inside sidewall, and the inside tabs and the outside tabs are positioned alternately to form the induction surface; and a set of permanent magnets positioned corresponding to the induction surface, and the set of permanent magnets having alternating north poles and south poles facing the induction surface;

wherein, the set of permanent magnets is maintained a distance away from the induction surface of the coil seat.

2. The electrical generator as claimed in claim 1, wherein the set of permanent magnets is an annular permanent magnet with multiple north poles and south poles arranged alternately.

3. The electrical generator as claimed in claim 2, wherein the coil is formed by winding an electrical conductive wire with two ends into the ring shape, with the two connecting wires electrically connected to opposite ends of the coil respectively.

4. The electrical generator as claimed in claim 1, wherein the coil is formed by winding an electrical conductive wire with two ends into the ring shape, with the two connecting wires electrically connected to opposite ends of the coil respectively.

* * * * *